(12) United States Patent
Kim et al.

(10) Patent No.: US 12,365,393 B2
(45) Date of Patent: Jul. 22, 2025

(54) BODY OF MOBILITY

(71) Applicants: Hyundai Motor Company, Seoul (KR); Kia Corporation, Seoul (KR)

(72) Inventors: Do Hoi Kim, Sejong-si (KR); Rico Haase, Chemnitz (DE); Frank Schieck, Chemnitz (DE); Andre Albert, Chemnitz (DE)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 500 days.

(21) Appl. No.: 17/888,896

(22) Filed: Aug. 16, 2022

(65) Prior Publication Data

US 2023/0211253 A1 Jul. 6, 2023

(30) Foreign Application Priority Data

Dec. 30, 2021 (KR) .................. 10-2021-0193122

(51) Int. Cl.
*B62D 25/08* (2006.01)
*A63H 33/10* (2006.01)
(Continued)

(52) U.S. Cl.
CPC ........... *B62D 25/08* (2013.01); *A63H 33/108* (2013.01); *A63H 33/12* (2013.01); *B62D 25/04* (2013.01);
(Continued)

(58) Field of Classification Search
CPC .................. B62D 25/00004; B62D 27/023; B62D 27/06; B62D 27/065; B62D 23/005;
(Continued)

(56) References Cited

U.S. PATENT DOCUMENTS 4,355,844 A * 10/1982 Fantini Muzzarelli ...................... B62D 23/005
403/174
4,440,434 A * 4/1984 Celli .................... B62D 29/001
296/205
(Continued)

FOREIGN PATENT DOCUMENTS

DE 10 2004 062 332 B3 6/2006
DE 10 2005 045 388 A1 3/2007
(Continued)

OTHER PUBLICATIONS

Office Action issued on May 8, 2024 in regard to the German patent application No. 102021116104.5.

*Primary Examiner* — Dennis H Pedder
(74) *Attorney, Agent, or Firm* — Morgan, Lewis & Bockius LLP

(57) ABSTRACT

A body of a mobility includes: a base part disposed outside a cabin room and extending in a longitudinal direction of the body, and including a first coupling surface; a fixed part extending in the longitudinal direction and coupled to the base part, and including a second coupling surface matching with the first coupling surface, the fixed part having an insertion hole being open toward one side thereof and extending in the longitudinal direction; and a pillar member having a first end inserted into the insertion hole of the fixed part to be coupled to the fixed part and a second end extended and being curved.

15 Claims, 6 Drawing Sheets

(51) Int. Cl.
*A63H 33/12* (2006.01)
*B62D 25/04* (2006.01)
*B62D 27/02* (2006.01)
*B62D 23/00* (2006.01)

(52) U.S. Cl.
CPC .......... *B62D 27/023* (2013.01); *A63H 33/107* (2013.01); *B62D 23/005* (2013.01)

(58) Field of Classification Search
CPC ...... B62D 25/00; B62D 25/04; A63H 33/108; A63H 33/12; A63H 33/107
USPC .......... 296/205, 193.06, 29, 30, 203.01, 2, 4
See application file for complete search history.

(56) References Cited

U.S. PATENT DOCUMENTS

| | | | |
|---|---|---|---|
| 6,102,472 A * | 8/2000 | Wallstrom | B62D 25/00 |
| | | | 296/205 |
| 10,351,177 B2 | 7/2019 | Steffans et al. | |
| 11,465,694 B2 * | 10/2022 | Kim | B62D 27/023 |

FOREIGN PATENT DOCUMENTS

| | | |
|---|---|---|
| DE | 10 2016 005 840 A1 | 11/2016 |
| DE | 102013218743 B4 | 8/2018 |
| EP | 1 073 579 B1 | 6/2002 |
| FR | 2 982 815 A1 | 5/2013 |
| JP | 9-118258 A | 5/1997 |
| KR | 10-1286416 B1 | 7/2013 |
| KR | 10-2014-0091510 A | 7/2014 |
| KR | 10-2015-0063854 A | 6/2015 |
| KR | 10-1765637 B1 | 8/2017 |
| KR | 10-1806722 B1 | 12/2017 |
| KR | 10-2021-0077367 A | 6/2021 |

* cited by examiner

BODY OF MOBILITY

CROSS REFERENCE TO RELATED APPLICATION

The present application claims the benefit of priority to Korean Patent Application No. 10-2021-0193122, filed on Dec. 30, 2021 in the Korean Intellectual Property Office, the entire contents of which is incorporated herein by reference.

TECHNICAL FIELD

The present disclosure relates to a body of a mobility, the body being configured to be lightweight by use of various materials, secure stiffness by structural design, realize various body designs by an assembly structure formed through bolting, etc., and be assembled with a cabin room by separately replacing the cabin room.

BACKGROUND

With recent development of autonomous driving technology and electrification technology, types of mobility have become diverse and a need for a body structure separable from a traditional vehicle has increased.

In a body of the traditional vehicle, a monocoque body or a frame body is the main constraint on production of various vehicle bodies. The conventional monocoque or frame body is made of a steel material, so securing stiffness is easy but there is a disadvantage in that the body is heavy.

Since the body is produced by welding, etc., it is difficult to expand the model of a vehicle because various parts are required in order to manufacture various types of bodies.

Furthermore, a new concept mobility is configured to replace a cabin room. A different type of a cabin room is coupled to the mobility with maintaining front and rear portions of the body or one type of a cabin room is coupled to different forms of front and rear portions or a floor of the body. There is a need for a concept that allows various types of mobility to be re-assembled depending on use of vehicle.

However, in the conventional monocoque or frame body, there is limit because it is difficult to replace the body.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to a body of a mobility, wherein the body is configured to be lightweight by use of various materials, secure stiffness by structural design, realize various body designs by an assembly structure formed through bolting, etc., and be assembled with a cabin room by separately replacing the cabin room.

In order to achieve the above object, according to one aspect of the present disclosure, there is provided a body of a mobility, the body of the mobility including: a base part disposed outside a cabin room and extending in a longitudinal direction of the body, and including a first coupling surface; a fixed part extending in the longitudinal direction and coupled to the base part, and including a second coupling surface matching with the first coupling surface, the fixed part having an insertion hole being open toward one side thereof and extending in the longitudinal direction; and a pillar member having a first end inserted into the insertion hole of the fixed part to be coupled to the fixed part and a second end extended and being curved.

The base part and the fixed part may be molded by extrusion to extend in the longitudinal direction and be coupled to each other by sliding on each other.

The base part may be a connector at the cabin room side of a front body in outer-front of the cabin room or of a rear body in outer-rear of the cabin room.

The base part and the fixed part that are in a coupled state may constitute a pillar apron member of the mobility.

The first coupling surface of the base part may include a vertical surface and a horizontal surface, and the base part may be coupled to the fixed part such that the first coupling surface thereof may surround one side surface of the fixed part.

The first coupling surface of the base part and the second coupling surface of the fixed part may respectively have a protrusion and a groove matching with each other, and when the protrusion of the base part is inserted into the groove of the fixed part, the base part and the fixed part may be coupled to each other.

Each of the protrusion and the groove may have a shape including a neck portion and a head portion, whereby the protrusion may be inserted into the groove by sliding to prevent separation of the base part and the fixed part from each other.

Each of the protrusion and the groove may be defined in a shape of a rail extending in the longitudinal direction, thus being coupled to each other by sliding on each other.

The first coupling surface of the base part and the second coupling surface of the fixed part may respectively have recessed portions facing each other, and the recessed portion of the first coupling surface and the recessed portion of the second coupling surface may join together to form a single fitting hole, and the base part and the fixed part may be coupled to each other as a rod is inserted into the fitting hole.

Each of the fitting hole and the rod may have a shape including a neck portion and a head portion, such that separation of the base part and the fixed part from each other may be prevented as the rod is inserted into the fitting hole by sliding.

The body of the mobility may include: a bolting part bolted to the rod that passes through the base part or the fixed part.

The first coupling surface or the second coupling surface may have a stiffness reinforcement part, and the stiffness reinforcement part may be inserted into a sliding groove defined in the first coupling surface or the second coupling surface so that the first coupling surface and the second coupling surface may be coupled to each other, and a lower surface of the stiffness reinforcement part may constitute a portion of the first coupling surface or the second coupling surface, and the recessed portion may be defined on the lower surface of the stiffness reinforcement part.

The rod may include a plurality of rod parts extending in the longitudinal direction, and a coupling pin may be inserted into a portion between the plurality of rod parts to press the rod parts toward the recessed portions, respectively corresponding to the rod.

A plastic bush may be disposed at an external circumferential surface of the first end of the pillar member, and the bush may be arranged between the first end of the pillar member and the insertion hole of the fixed part.

The pillar member may have a shape of a pipe and the first end of the pillar member may have a shape a straight pipe, so the pillar member may be inserted into the insertion hole of the fixed part by sliding.

According to the present disclosure, the body of the mobility can be lightweight by use of various materials, secure stiffness by the structural design, realize various body designs by being assembled through bolting, etc., and be assembled with the cabin room by separately replacing the cabin room.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
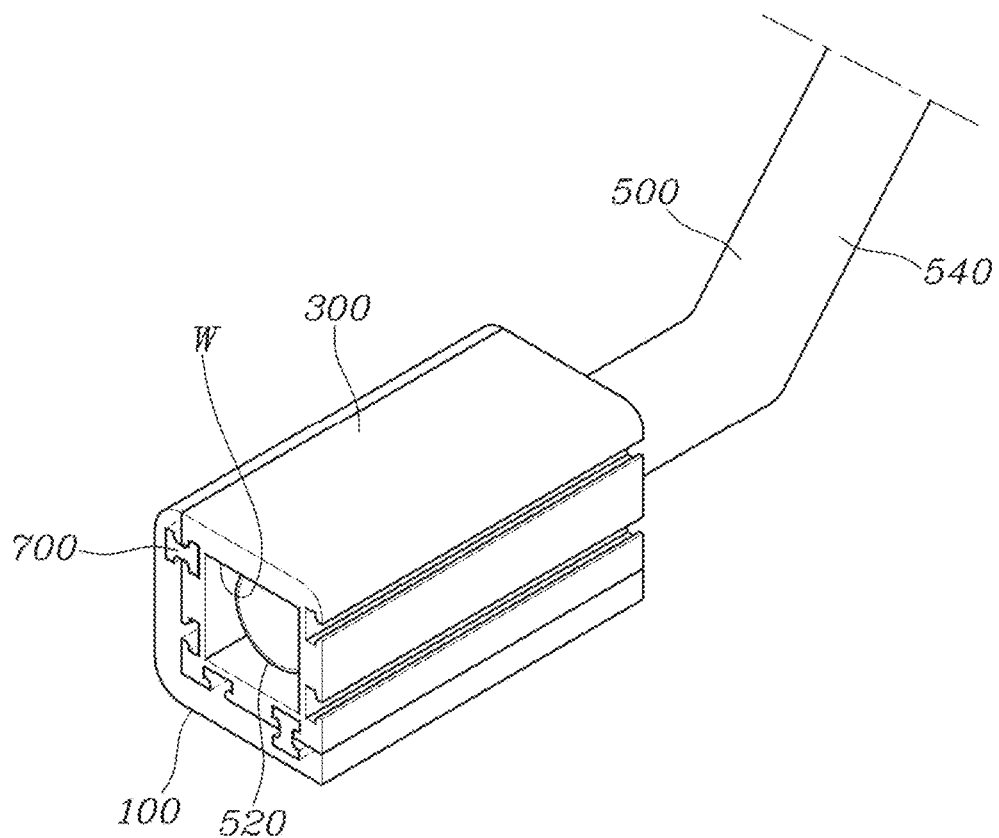
FIG. 1 is a perspective view showing a body of a mobility according to an embodiment of the present disclosure.
Figure 2:
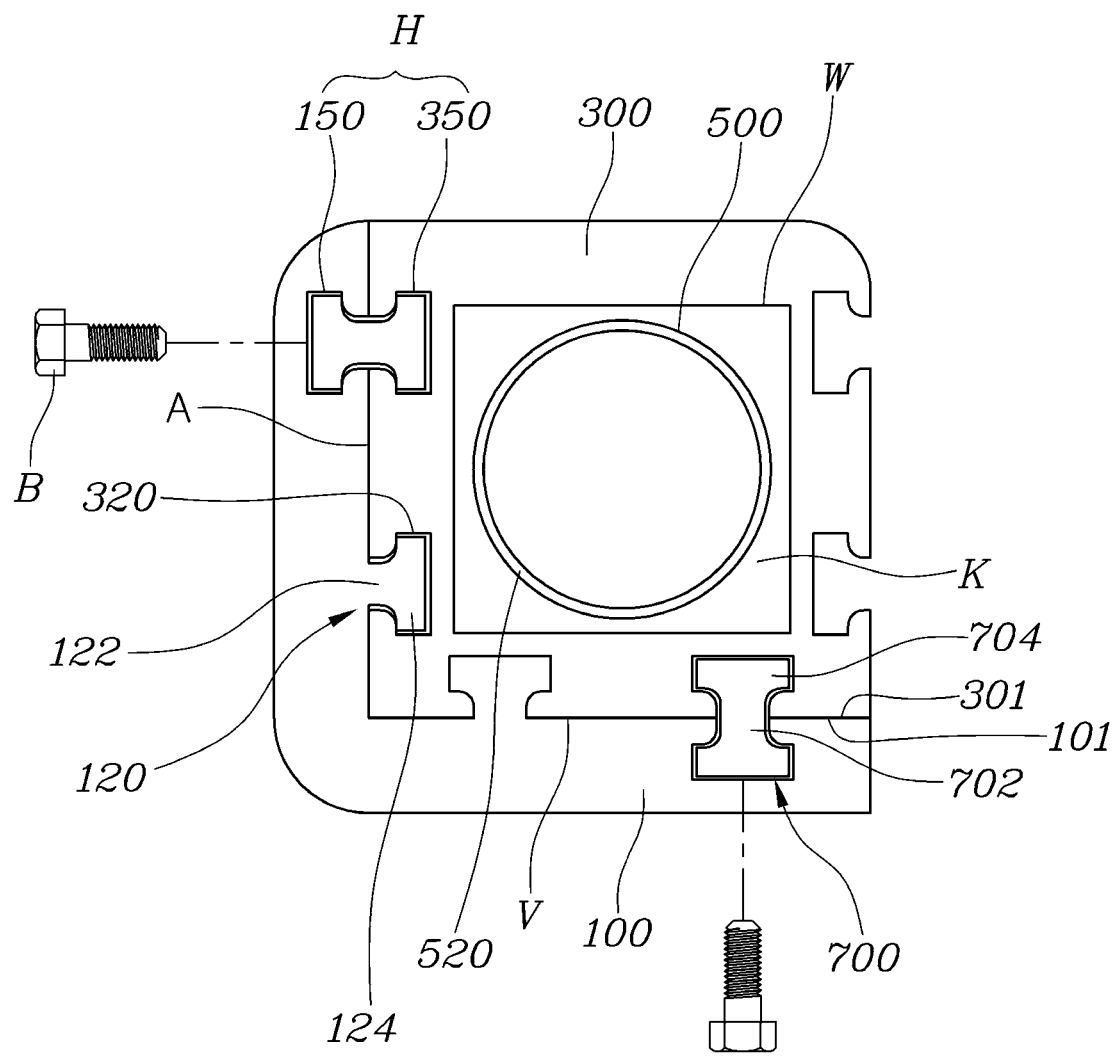
FIG. 2 is a sectional view showing the body of the mobility according to the embodiment of the present disclosure.
Figure 3:
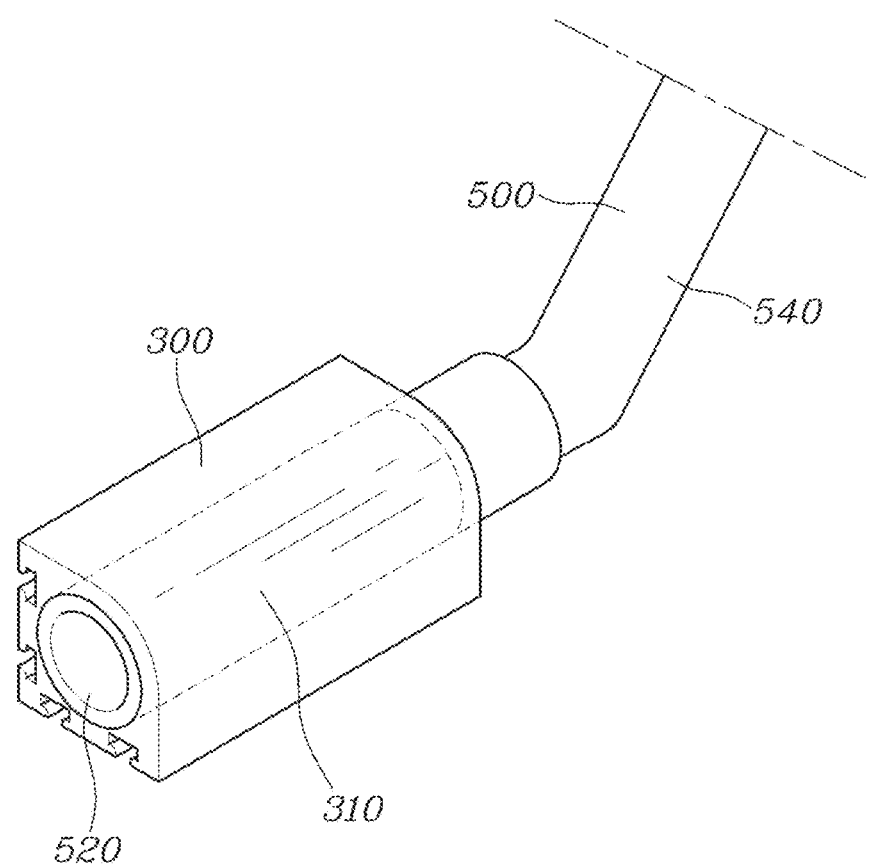
FIG. 3 is a view showing a fixed part of the mobility of the embodiment of the present disclosure.
Figure 4:
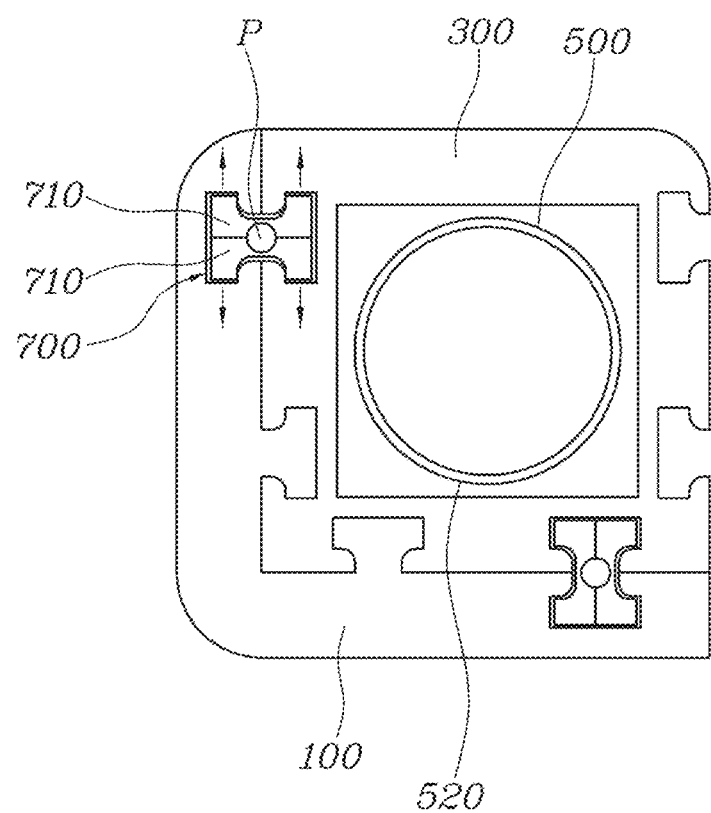
FIGS. 4 and 5 are views showing a body of a mobility according to another embodiment of the present disclosure.
Figure 5:
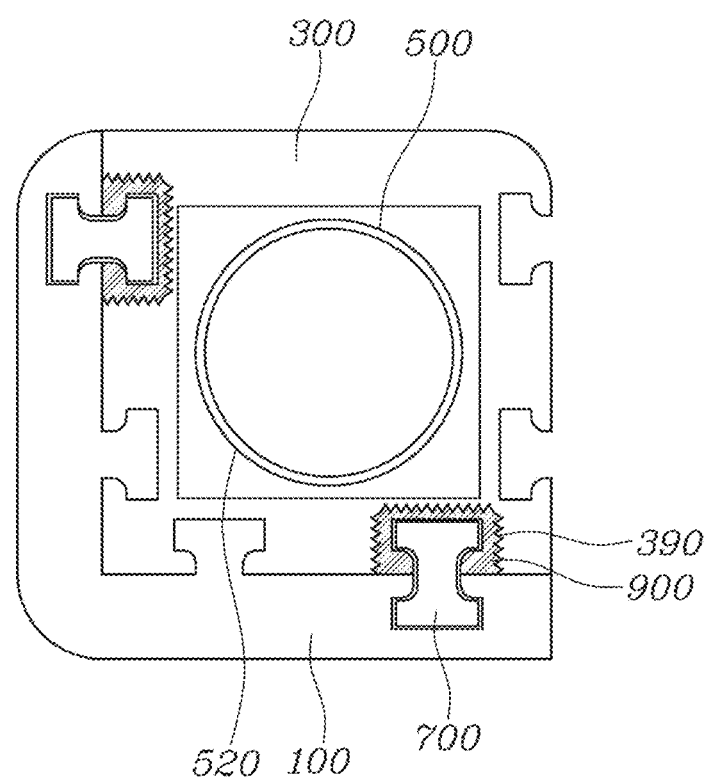
Figure 6:
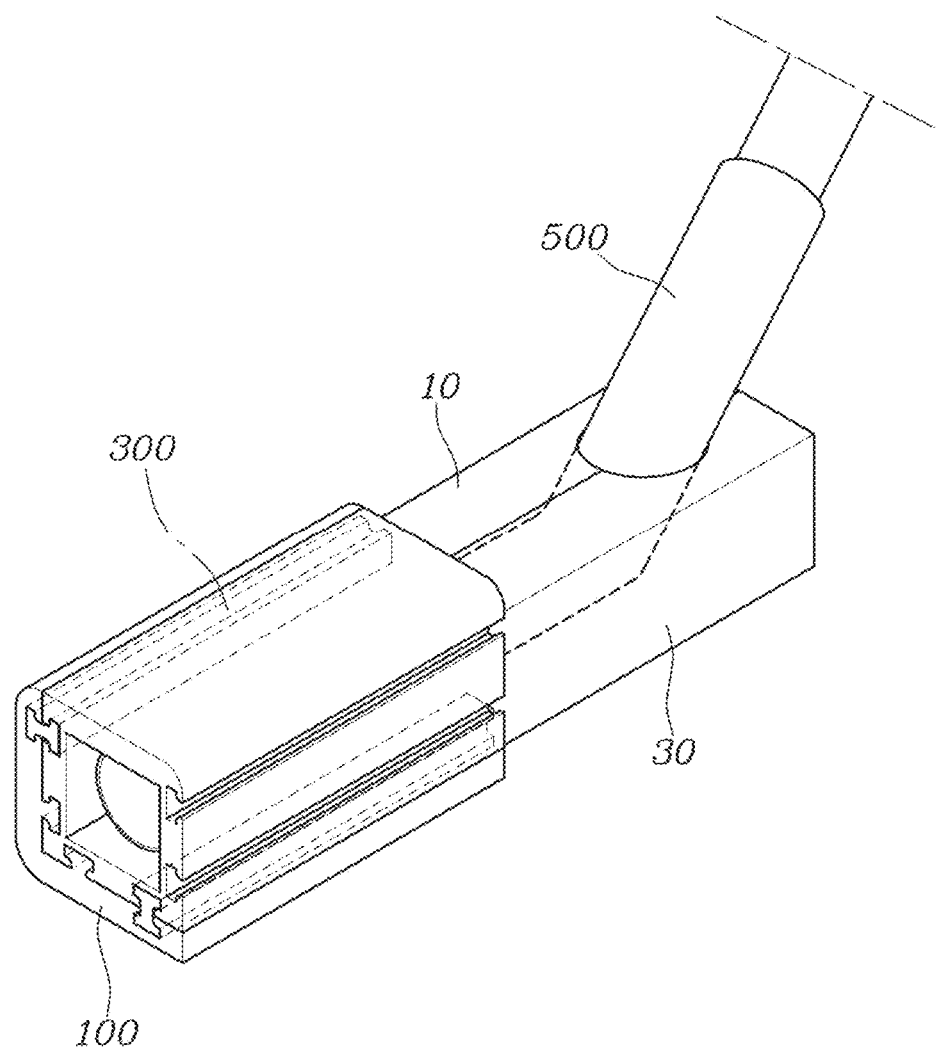
FIG. 6 is a perspective view showing the body of the mobility according to the embodiment of the present disclosure with a panel coupled to the body of the mobility.

FIG. 1 is a perspective view showing a body of a mobility according to an embodiment of the present disclosure. FIG. 2 is sectional view showing the body of the mobility according to the embodiment of the present disclosure. FIG. 3 is a view showing a fixed part of the mobility of the embodiment of the present disclosure. FIGS. 4 and 5 are views showing a body of a mobility according to another embodiment of the present disclosure. FIG. 6 is a perspective view showing the body of the mobility according to the embodiment of the present disclosure with a panel coupled to the body of the mobility.

FIG. 1 is the perspective view showing the body of the mobility according to the embodiment of the present disclosure. The body of the mobility according to the present disclosure includes: a base part 100 disposed outside a cabin room and extending in a longitudinal direction, and having a first coupling surface 101; a fixed part 300 extending in the longitudinal direction and coupled to the base part 100 by sliding, having a second coupling surface 301 matching with the first coupling surface 101, having an insertion hole W open to one side thereof and extending in the longitudinal direction; and a pillar member 500 having a first end inserted into the insertion hole W of the fixed part 300 to be coupled to the fixed part 300 and a second end curved and extending to constitute a pillar part of the cabin room.

The present disclosure is intended to realize an assembly body, and assembly of the body is possible by bolting to allow separation or assembly of the cabin room and a front or rear portion of the body. Therefore, replacement of the cabin room, a vehicle driving part, or a loading part is facilitated so that various types of body may be realized.

In using the assembly body, it is possible to reduce the weight of the body by using a plastic material. The present disclosure is intended to provide a structure configured to secure stiffness that is required despite of the lightweight material and the assembly structure.

Specifically, the cabin room of the body has an upper portion consisting of an A-pillar, a roof, and a C-pillar. The present disclosure relates to a connection structure between the A-pillar or the C-pillar and the front portion or the rear portion in the body. As the connection structure is replaced in an assembly manner, the A-pillar and the C-pillar may be separated from and coupled to a front portion (engine room part), a rear portion (trunk part), or a platform (floor). Accordingly, replacement of the cabin room may be performed.

For the above purpose, the base part 100 is disposed at the front portion or The rear portion of the body. The base part 100 is disposed at the front portion or the rear portion of the body outside the cabin room. The base part 100 has the form extending in the longitudinal direction of the body and may be coupled to other parts by sliding. The base part 100 has the first coupling surface 101 and the coupling of the base part 100 is performed on the first coupling surface 101 by sliding.

The fixed part 300 having the form extending in the longitudinal direction and coupled to the base part 100 by sliding is disposed at the cabin room side. The fixed part 300 has the second coupling surface 301 matching with the first coupling surface 101 and the insertion hole W open to one side thereof and extending in the longitudinal direction. The pillar member 500 is inserted through an open portion of the insertion hole W of the fixed part 300.

The first end of the pillar member 500 is inserted in the insertion hole W of the fixed part 300 to be coupled to the fixed part 300. The second end of the pillar member 500 is extended and curved to constitute the pillar part of the cabin room.

Therefore, the pillar member 500 of the cabin room is inserted in and coupled to the fixed part 300, so sharing of the fixed part 300 may be performed despite of various forms of the pillar member 500 to reduce manufacturing cost of the mobility. The fixed part 300 is coupled to the base part 100 at the body front portion or the body rear portion by sliding, so that various types of the cabin room may be combined to the body front portion, the body rear portion, or the platform.

In other words, even when the cabin room, the body front portion or the body rear portions, or the platform has various forms, the cabin room, the body front portion or the body rear portions, or the platform uses the fixed part 300 and the base part 100 that can be commonly used, whereby parts sharing is possible and reciprocal re-combination is possible. In addition, when the coupling is performed by sliding in the longitudinal direction of the body, desired body stiffness may be secured.

Specifically, FIG. 1 is the perspective view showing the body of the mobility according to the embodiment of the present disclosure. FIG. 2 is a sectional view showing the body of the mobility according to the embodiment of the present disclosure.

The base part 100 and the fixed part 300 of the present disclosure are molded by extrusion thereby extending in the longitudinal direction and may be coupled to each other by sliding. Lightweight of the base part 100 and the fixed part 300 may be realized by a material such as aluminum or plastic. Stiffness of the base part 100 and the fixed part 300 may be further secured by extrusion rather than die casting or casting. Sliding-coupling between the base part 100 and the fixed part 300 is possible as surfaces of the base part 100 and the fixed part 300 are formed uniformly by extrusion.

The base part 100 may be a connector at the cabin room side of the front body in outer-front of the cabin room or of the rear body in outer-rear of the cabin room. In other words, the base part 100 is disposed at the body outside the cabin room and serves as a portion connected to the cabin room. As shown in the drawing, the embodiment shows the base part 100 and the fixed part 300 in the coupled state constituting a pillar apron member of the mobility.

Meanwhile, the base part 100 has the first coupling surface 101 including a vertical surface A and a horizontal surface V. The base part 100 may be coupled to the fixed part 300 such that the first coupling surface 101 surrounds one side surface of the fixed part 300. As shown in the drawing, the base part 100 has the curved form with the vertical surface A and the horizontal surface V connected to each other. The fixed part 300 is seated on the vertical surface A and the horizontal surface V by sliding to have the form being surrounded by the vertical surface A and the horizontal surface V. Therefore, even when an external force is applied on the mobility, the base part 100 disposed below the fixed part 300 supports the fixed part 300 so that the desired stiffness may be secured. In addition, the base part 100 secures a support force in both X-axis and Y-axis so as to secure driving stiffness of the mobility, and location limitation in opposite directions is performed to facilitate management of assembly tolerance.

The first coupling surface 101 of the base part 100 and the second coupling surface 301 of the fixed part 300 have a protrusion 120 and a groove 320 matching with each other. When the protrusion 120 is inserted in the groove 320, the base part 100 and the fixed part 300 may be coupled to each other. As shown in FIG. 2, the base part 100 has the protrusion 120 and the fixed part 300 has the groove 320, and the protrusion 120 is coupled to the groove 320 by sliding to allow the base part 100 and the fixed part 300 to be coupled.

Specifically, the protrusion 120 includes a neck portion 122 and a head portion 124 and the groove 320 has a shape corresponding to the shape of the protrusion 120, so that separation of the protrusion 120 after being fitted into the groove 320 by sliding may be prevented. In other words, the head portion 124 of the protrusion 120 is locked by the neck portion of the groove 320 to prevent separation of the head portion. Each of the protrusion 120 and the groove 320 is integrally formed by extrusion in a rail form extending in the longitudinal direction, and the protrusion 120 and the groove 320 may be coupled to each other by sliding on each other.

The first coupling surface 101 of the base part 100 and the second coupling surface 301 of the fixed part 300 have recessed portions 150 and 350 that face each other. The recessed portions 150 and 350 of the first coupling surface 101 and the second coupling surface 301 join together to form a single fitting hole H and a rod 700 is inserted into the fitting hole H, whereby the base part 100 and the fixed part 300 may be coupled.

Each of the fitting hole H and the rod 700 has a shape including a neck portion 702 and a head portion 704. When the rod 700 is inserted into the fitting hole H by sliding, separation of the base part 100 and the fixed part 300 from each other may be prevented. Insertion of the rod 700 may remove a tolerance or a clearance generated during assembly regardless of the protrusion 120 and the groove 320. Since coupling of the base part 100 and the fixed part 300 should be performed by sliding on each other, the base part 100 and the fixed part 300 are designed to have a predetermined clearance. After sliding-coupling, the separate rod 700 is inserted into the fitting hole H and is pressed, so that the clearance on the design may be removed. Therefore, the body may maintain a coupling force and stiffness and completely realize a load pass during an impact. In addition, driving noise generated due to the clearance may be prevented.

Specifically, the body of the present disclosure may include a bolting part B bolted to the rod 700 after passing through the base part 100 or the fixed part 300. In other words, after the rod 700 is inserted into the fitting hole, the bolting part B passes through the base part 100 from the outside and then is bolted to the rod 700. Accordingly, when the rod 700 is pulled toward the base part 100, the fixed part 300 may be naturally pulled to remove clearances between the parts.

Meanwhile, it is possible to use a separate stiffness reinforcement part 900 as shown in FIG. 5. In case of using the stiffness reinforcement part 900, the stiffness reinforcement part 900 is coupled to the fixed part 300 made of plastic for additional lightweight. The stiffness reinforcement part 900 may be arranged at the first coupling surface 101 or the second coupling surface 301. The stiffness reinforcement part 900 is coupled to the first coupling surface 101 or the second coupling surface 301 by being fitted into a sliding groove 390 defined in the first coupling surface 101 or the second coupling surface 301. A lower surface of the stiffness reinforcement part 900 constitutes a portion of the first coupling surface 101 or the second coupling surface 301 and the recessed portion 150, 350 may be defined on the lower surface of the stiffness reinforcement part 900. The rod 700 is inserted into the recessed portions 150 and 350.

The stiffness reinforcement part 900 is made of metal, so that lightweight and desired stiffness may be secured even when the base part 100 or the fixed part 300 is made of plastic. In particular, the stiffness reinforcement part 900 has the form of wedges or unevenness at an outer surface thereof and the sliding groove 390 has also the form of wedges or unevenness like the stiffness reinforcement part 900. Accordingly, sliding-coupling between the base part 100 and the fixed part 300 may be performed and a coupling force of the base part 100 and the fixed part 300 may be maintained.

As shown in FIG. 4, the rod 700 consists of a plurality of rod parts 710 extending in the longitudinal direction. A coupling pin P is inserted into a portion between the rod parts 710 to press the rod parts 710 toward the recessed portions, respectively, corresponding to the rod part. In other words, the rod 700 consists of the plurality of rod parts 710 and the coupling pin P is inserted between the rod parts 710 by bolting, and the coupling pin P presses the rod parts 710 in respective outside directions. Therefore, clearances between the base part 100, the fixed part 300, and the rod 700 may be removed. Conversely, when the coupling pin P is disassembled from the rod 700, the clearances exist again, and sliding-separation of the base part 100 and the fixed part 300 from each other may be easily performed.

As shown in FIGS. 2 and 3, a plastic bush K is disposed at an external circumferential surface of the first end of the pillar member 500. The bush K may be arranged between the first end of the pillar member 500 and the insertion hole K of the fixed part 300. A clearance between the first end of the pillar member 500 and the fixed part 300 may be removed by the bush K, and the pillar member 500 may be coupled to the fixed part 300 by being forcibly inserted. As shown in FIG. 3, when an outer edge 310 of the fixed part 300 includes a curved surface, a desired curved apron design may be realized.

The pillar member 500 is defined in a shape of a pipe with various sections. The first end of the pillar member 500 is defined in a shape of a straight pipe and is inserted into the insertion hole W of the fixed part 300 by sliding, and a remaining portion of the pillar member 500 is curved as needed to realize the form of the pillar member 500.

For example, FIG. 6 shows an embodiment in which the pillar member 500 is coupled to an inner panel 10 and an outer panel 30 to realize a door flange, etc. to finish the assembly of the body. When the body is realized as shown in FIG. 6, a pillar structure of the present disclosure may be applied to a conventional monocoque body.

According to the present disclosure, the body of the mobility may be lightweight by various materials applied into the body, stiffness may be secured by structural design, various body designs may be realized as the body is assembled through bolting, etc., and the cabin room may be separately replaced in an assembly manner.

Although preferred embodiments of the present disclosure have been described for illustrative purposes, those skilled in the art will appreciate that various modifications, additions and substitutions are possible, without departing from the scope and spirit of the disclosure as disclosed in the accompanying claims.

What is claimed is:

1. A body of a mobility, the body comprising:
   a base part disposed outside a cabin room and extending in a longitudinal direction of the body, and comprising a first coupling surface;
   a fixed part having a body, extending in the longitudinal direction and coupled to the base part, and comprising a second coupling surface matching with the first coupling surface, the fixed part having an insertion hole passing through the body in the longitudinal direction, being open toward one side thereof and extending in the longitudinal direction; and
   a pillar member having a first end inserted into the insertion hole of the fixed part to be coupled to the fixed part and a second end extended and being curved.

2. The body of claim 1, wherein the base part and the fixed part are molded by extrusion to extend in the longitudinal direction and are coupled to each other by sliding on each other.

3. The body of claim 1, wherein the base part is a connector at a cabin room side of a front body in outer-front of the cabin room or of a rear body in outer-rear of the cabin room.

4. The body of claim 1, wherein the base part and the fixed part that are in a coupled state constitute a pillar apron member of the mobility.

5. The body of claim 1, wherein the first coupling surface of the base part comprises a vertical surface and a horizontal surface, and the base part is coupled to the fixed part such that the first coupling surface thereof surrounds one side surface of the fixed part.

6. The body of claim 1, wherein the first coupling surface of the base part and the second coupling surface of the fixed part respectively have a protrusion and a groove matching with each other, and when the protrusion of the base part is inserted into the groove of the fixed part, the base part and the fixed part are coupled to each other.

7. The body of claim 6, wherein each of the protrusion and the groove has a shape including a neck portion and a head portion, whereby the protrusion is inserted into the groove by sliding to prevent separation of the base part and the fixed part from each other.

8. The body of claim 6, wherein each of the protrusion and the groove is defined in a shape of a rail extending in the longitudinal direction, thus being coupled to each other by sliding on each other.

9. The body of claim 1, wherein the first coupling surface of the base part and the second coupling surface of the fixed part respectively have recessed portions facing each other, the recessed portion of the first coupling surface and the recessed portion of the second coupling surface join together to form a single fitting hole, and the base part and the fixed part are coupled to each other as a rod is inserted into the fitting hole.

10. The body of claim 9, wherein each of the fitting hole and the rod has a shape including a neck portion and a head portion, such that separation of the base part and the fixed part from each other is prevented as the rod is inserted into the fitting hole by sliding.

11. The body of claim 9, further comprising:
    a bolting part bolted to the rod that passes through the base part or the fixed part.

12. The body of claim 9, wherein the first coupling surface or the second coupling surface has a stiffness reinforcement part, and the stiffness reinforcement part is inserted into a sliding groove defined in the first coupling surface or the second coupling surface so that the first coupling surface and the second coupling surface are coupled to each other, and a lower surface of the stiffness reinforcement part constitutes a portion of the first coupling surface or the second coupling surface, and the recessed portion is defined on the lower surface of the stiffness reinforcement part.

13. The body of claim 9, wherein the rod comprises a plurality of rod parts extending in the longitudinal direction, and a coupling pin is inserted into a portion between the plurality of rod parts to press the plurality of rod parts toward the recessed portions, respectively, corresponding to the rod.

14. The body of claim 1, wherein a plastic bush is arranged at an external circumferential surface of the first end of the pillar member, and the bush is arranged between the first end of the pillar member and the insertion hole of the fixed part.

15. The body of claim 1, wherein the pillar member is defined in a shape of a pipe and the first end of the pillar member is defined in a shape a straight pipe, so the pillar member is inserted into the insertion hole of the fixed part by sliding.

* * * * *